(12) United States Patent
Johanns et al.

(10) Patent No.: US 8,152,056 B2
(45) Date of Patent: Apr. 10, 2012

(54) SECURE CARDS AND METHODS

(75) Inventors: Lawrence J. Johanns, Golden Valley, MN (US); Henning W. VonKlinggraeff, Richfield, MN (US)

(73) Assignee: Veritec, Inc., Golden Valley, MI (US)

( * ) Notice: Subject to any disclaimer, the term of this patent is extended or adjusted under 35 U.S.C. 154(b) by 607 days.

(21) Appl. No.: 12/317,247

(22) Filed: Dec. 19, 2008

(65) Prior Publication Data

US 2009/0140044 A1 Jun. 4, 2009

Related U.S. Application Data

(63) Continuation of application No. 11/253,064, filed on Oct. 18, 2005, now Pat. No. 7,484,659.

(60) Provisional application No. 60/620,397, filed on Oct. 19, 2004.

(51) Int. Cl.
*G06K 5/00* (2006.01)

(52) U.S. Cl. ........................................ 235/380; 235/486

(58) Field of Classification Search .................. 235/380, 235/382, 375, 492, 493, 381, 486, 487; 705/41, 705/35, 37, 39
See application file for complete search history.

(56) References Cited

U.S. PATENT DOCUMENTS

| | | | |
|---|---|---|---|
| 4,700,055 A | 10/1987 | Kashkashian, Jr. | |
| 4,924,078 A | 5/1990 | Sant'Anselmo et al. | |
| 4,972,475 A | 11/1990 | Sant'Anselmo | |
| 5,053,612 A * | 10/1991 | Pielemeier et al. | 235/462.42 |
| 5,266,781 A | 11/1993 | Warwick et al. | |
| 5,331,176 A | 7/1994 | Sant'Anselmo et al. | |
| 5,612,524 A | 3/1997 | Sant'Anselmo et al. | |
| 5,770,843 A | 6/1998 | Rose et al. | |
| 5,773,806 A * | 6/1998 | Longacre, Jr. | 235/462.1 |
| 5,945,655 A * | 8/1999 | Gilgeous et al. | 235/454 |
| 5,949,057 A * | 9/1999 | Feng | 235/472.01 |
| 6,182,891 B1 | 2/2001 | Furuhashi et al. | |
| 6,318,633 B1 | 11/2001 | Drexler | |
| 6,330,543 B1 * | 12/2001 | Kepecs | 705/14.17 |
| 6,588,658 B1 | 7/2003 | Blank | |
| 6,941,279 B1 | 9/2005 | Sullivan | |
| 7,353,996 B2 * | 4/2008 | Goodman et al. | 235/462.01 |
| 7,805,333 B2 * | 9/2010 | Kepecs | 705/14.17 |
| 2001/0034717 A1 | 10/2001 | Whitworth | |
| 2002/0096561 A1 | 7/2002 | Sullivan | |
| 2004/0117627 A1 | 6/2004 | Brewington | |
| 2004/0256451 A1 | 12/2004 | Goman et al. | |
| 2005/0130735 A1 | 6/2005 | Ellis | |
| 2007/0102510 A1 | 5/2007 | Beemer et al. | |
| 2007/0118474 A1 | 5/2007 | Tushie et al. | |
| 2007/0239603 A1 | 10/2007 | Lasater et al. | |

FOREIGN PATENT DOCUMENTS

| | | |
|---|---|---|
| JP | 2002086809 | 3/2002 |
| WO | WO 89/03100 | 4/1989 |
| WO | WO 97/31343 | 8/1997 |
| WO | WO 98/24049 | 6/1998 |
| WO | WO 00/00923 | 1/2000 |

* cited by examiner

*Primary Examiner* — Thien M Le
(74) *Attorney, Agent, or Firm* — Kagan Binder, PLLC

(57) ABSTRACT

The present invention generally relates to credit cards and debit cards. More particularly, the present invention relates to security methods and techniques that can be used with credit and debit cards and the like in order to provide protection against unauthorized use.

13 Claims, 3 Drawing Sheets

SECURE CARDS AND METHODS

CROSS-REFERENCE TO RELATED APPLICATIONS

The present application is a Continuation of U.S. patent application Ser. No. 11/253,064, filed Oct. 18, 2005, now U.S. Pat. No. 7,484,659 now allowed, which claims the benefit of commonly owned provisional Application having Ser. No. 60/620,397, filed on Oct. 19, 2004, and entitled SECURE CARDS AND METHODS, which Application is incorporated herein by reference in its entirety.

TECHNICAL FIELD

The present invention generally relates to credit cards and debit cards. More particularly, the present invention relates to security methods and techniques that can be used with credit and debit cards and the like in order to provide protection against unauthorized use.

BACKGROUND

Credit cards, including debit and other financial transaction cards, are well known and have been successfully utilized for conducting business transactions as well as for authenticating individuals for many years. Credit cards are typically constructed from a durable material having a rectangular shape. Credit cards usually contain specific information that relates to identification or financial information of a cardholder. Such information may be embossed on the card or contained in a magnetic strip provided on the card. Information may consist of alphanumeric characters corresponding to the individuals account number, identifying PIN number or other personal data. Each type of card typically carries unique data for a particular financial institution, retail loyalty program, or the like.

Today many consumers use these types of cards in making payment transactions at grocery stores, gas stations, and other retail locations. These cards may be in the form of a credit card, debit card, loyalty card, or check card, for example. In many cases an individual uses a variety of payment methods and may have several payment cards with them at any given time. For example, one may carry a credit card that can be used practically anywhere and may also carry a credit card that can only be used at a specific retail store such as a department store or consumer electronics store. As the individual uses these cards, they must choose the card that they are going to utilize for payment and provide it to either the clerk behind the counter or swipe it through a reader. In any given transaction, an individual's financial information, such as account number, personal identification number (PIN) and personal information may be exposed to several different people, whether it is the clerk behind the counter, the waitress taking an order, or another individual in a position to see such information. This is because account numbers and other sensitive information are usually printed on the face of such cards. Moreover, such information is sometimes visible on display screens and paper receipts and the like. All of these points of contact can lead to exposure and potential fraudulent and illegal use of confidential information.

With the increase of fraud and identity theft, financial institutions and individuals are having to pay for losses because of such theft and thereby have a growing interest and need in providing privacy and security to the means in which they provide financial and informational transactions. The need to minimize the exposure of this type of information to unauthorized individuals becomes key to increasing the security for these types of transactions. Managing the numerous financial transaction cards and the like that individuals often carry can become cumbersome and thereby increases the risk of theft and loss.

SUMMARY OF INVENTION

The present invention therefore provides the ability to provide the transactional capability of one or more cards in a single secure and useable format. For example, information related to the transactional capability of such cards is preferably provided in a coded mark such as in bar code or a binary two-dimensional matrix that can be printed or otherwise provided on a single card. As such, a single card may functionally include plural transaction techniques based on a plurality of individual transaction cards that can be individually accessed and used. Advantageously, a card having such plural transaction techniques can be made easily and inexpensively and provides a high level of security.

One aspect of the present invention provides a high security transaction card in which information related to one or more financial accounts as well as any other information such as identification or authentication information is provided in a coded mark such as a bar code or a two-dimensional binary symbol printed or otherwise provided on the card. The coded mark can be read and decoded to provide secure functional access to any of the financial accounts or other information.

Another aspect of the present invention provides a system that can functionally provide the transactional capability of one or more cards, such as financial transaction cards, for example, into a single secure card so that the transactional capability of each of the one or more individual cards can be accessed and used. The system preferably includes software that can encode information related to the transactional capability of each individual card into a single two-dimensional matrix and hardware that can print or otherwise provide the two-dimensional symbol onto a single secure card. For example, an individual may desire to combine the transactional capability of plural credit cards into a single secure transaction card. All of the information in each of the plural credit cards needed for completing a transaction can be encoded into a two-dimensional matrix by the software and printed on a single card. The card can be used at those facilities that have a card reader, in accordance with the present invention, that can read and decode the two-dimensional symbol. Once the card is read, the two-dimensional symbol decoded, and the identity of the cardholder is preferably validated, an associated screen can display icons of all of the credit cards that are functionally provided by the card. Any confidential or private information such as credit card numbers, PIN numbers, or expiration dates could remain hidden from viewing yet allow the individual to select the type of payment to be used. Upon selecting the payment method the transaction process would continue utilizing current methodologies.

BRIEF DESCRIPTION OF THE DRAWINGS

The accompanying drawings, which are incorporated in and constitute a part of this application, illustrate several aspects of the invention and together with the description of the embodiments serve to explain the principles of the invention. A brief description of the drawings is as follows.

DETAILED DESCRIPTION

Figure 1:
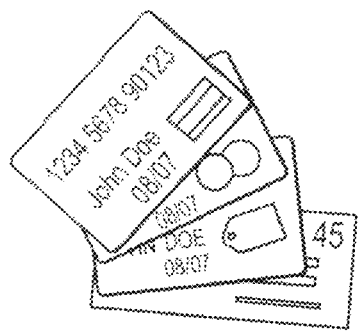
FIG. 1 shows a sample of the types of credit cards, loyalty cards, and check cards that an individual may carry with them at any given time.
Figure 2:
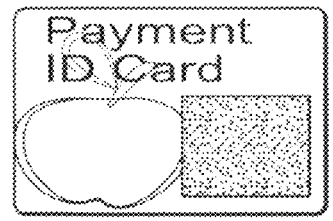
FIG. 2 shows a secure card in accordance with the present invention having financial data from plural cards encoded into a two-dimensional matrix in accordance to the present invention.

Currently an individual may posess multiple cards which they use for making purchases such as those shown in FIG. 1. They usually tend to carry them in their purse or wallet. The number and types of cards may vary and may include financial transaction cards, loyalty cards, check cards, phone cards, identification and licensing cards, and the like. The present invention allows the individual to provide all of the needed data and information from one or more cards into a secure coded mark such as a bar code or a two-dimensional matrix and store it on a single card such as shown in an exemplary manner in FIG. 2.

Figure 3:
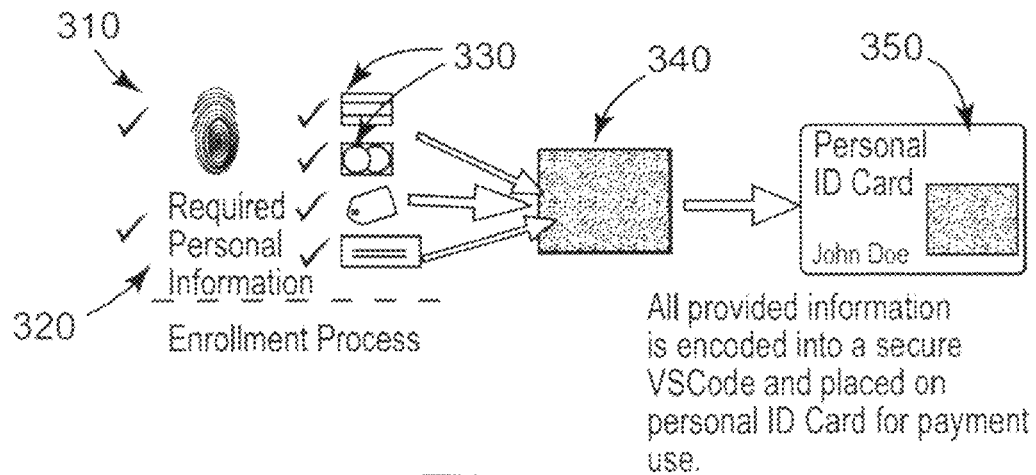
FIG. 3 is a schematic diagram showing how a person could combine plural transaction cards along with fingerprint and authentication data and have it encoded into a two-dimensional matrix and printed in accordance to the present invention.
Figure 5:
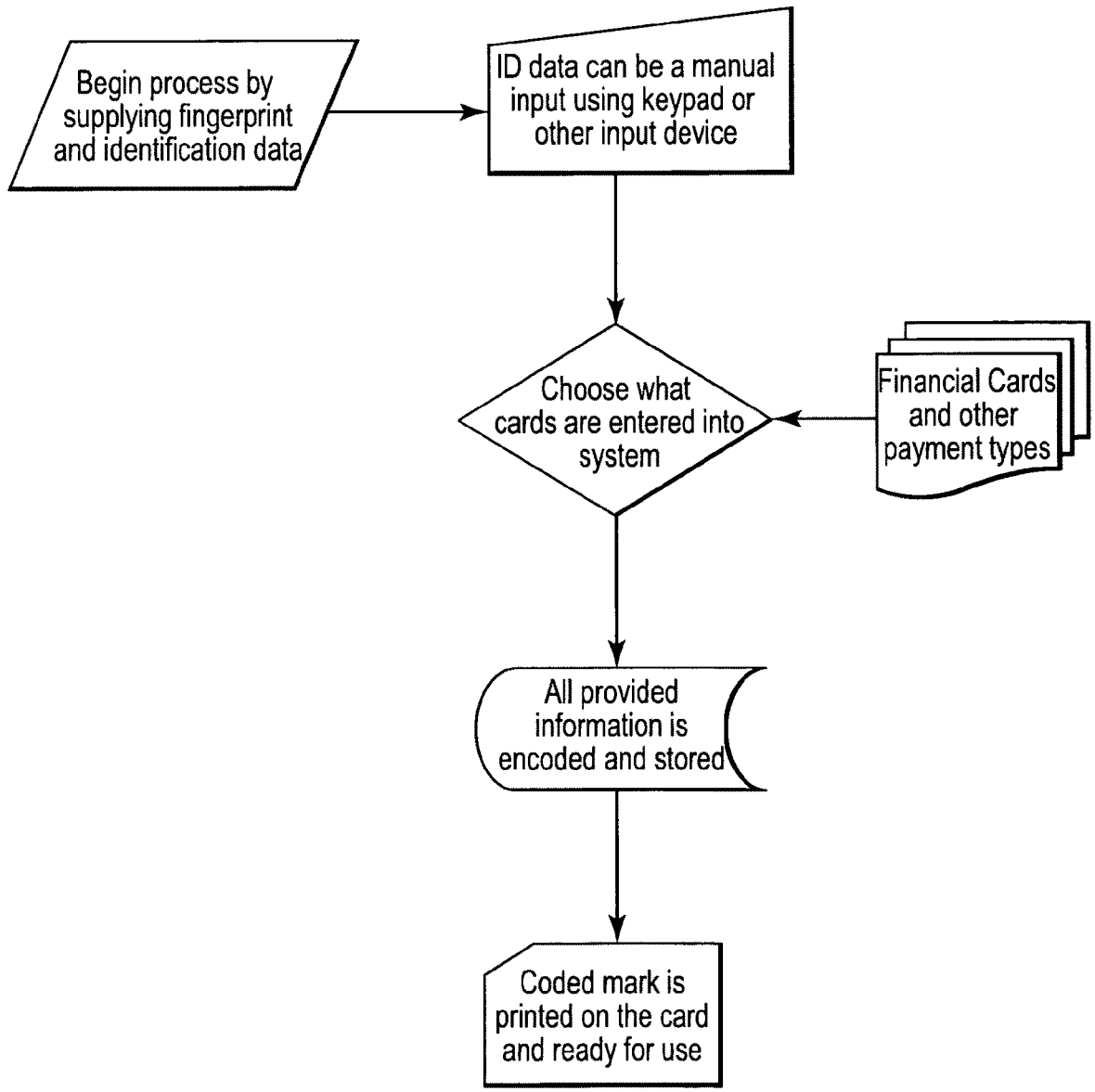
FIG. 5 is a flow chart showing a process that can be used to combine plural cards into a single card in accordance to the present invention.

Generally, as exemplified schematically in FIG. 3 and shown as a flowchart in FIG. 5, a process of making a secure card in accordance with the present invention is shown and preferably includes steps of obtaining data from a data source, encoding the data, generating a digital data matrix from the encoded data, and storing the data. However, additional steps are contemplated such as data processing steps for manipulating, converting, editing, or otherwise acting on or processing the data in any desired way.

An initial step of the process preferably comprises obtaining data from a data source. The data may comprise any data that is desired to be provided in a secure and encrypted form. Such data may comprise data from one or more financial transaction cards 330, or the like, personal or biometric data such as fingerprint data 310, account based information, such as access numbers 320 or the like, or any other information, for example. The present invention is particularly applicable to data that is desired to be transportable such as by being carried on the person or the like. Such data may be provided in any form such as an alphanumeric, graphical, or image-based form. Personal data may include personal information such as a person's name, address, account numbers, bank codes and the like. Biometric data may be a finger print identification, face feature identification, eye feature identification, face image, electronic signature identification or other means to specifically identify an individual person. In any case, the data preferably comprises storable data that is desired to be stored in a secure encrypted form and printed or otherwise provided onto a card in a secure manner.

After the data is identified, an encoding step is preferably used to encode the data. Such encoding is used to put the data into digital form and may include steps of storing data in memory, entering data by keying with a keyboard or the like, reading data from a magnetic strip of a card, creating images or pictures, as well a scanning a thumbprint or eye scan or other biometric based data. Preferably a software coding process is used and such software coding of data can be done by any desired technique. For example, data to be encoded can be converted to a binary stream of ones and zeros. The binary information can then be further encrypted to allow Error Detection And Correction (EDAC). Reed-Solomon error correction, now used by almost all 2D bar codes, is a byte-correcting scheme that is widely used for digital storage applications in fields such as telecommunications, for example. By this technique, Reed-Solomon error correcting code words are incorporated along with data code words to form an integrated message. Area symbologies as well as techniques for electronically coding data are well known, such as are described in U.S. Pat. No. 5,612,524, U.S. Pat. No. 5,331,176, U.S. Pat. No. 4,972,475, and U.S. Pat. No. 4,924,078, the entire disclosures of which are incorporated herein by reference for all purposes. Other techniques for encoding and decoding information are also disclosed in Applicant's copending U.S. Provisional Patent Application No. 60/567,761, entitled "Methods for Encoding and Decoding Information," filed on May 3, 2004, the entire disclosure of which is incorporated herein by reference for all purposes. Also, secure cards using two-dimensional marks and method of making and using such cards are disclosed in Applicant's copending U.S. patent application Ser. No. 10/713,247, entitled "High-Security Card and System," filed on Nov. 13, 2003, the entire disclosure of which is incorporated herein by reference for all purposes.

A digital data matrix 340, in the form of a symbol or mark, is then preferably provided from the encoded data. Any symbol or mark such as a bar code or two-dimensional code may be used. The digital data matrix may be provided by printing or the digital data matrix can be provided in an electronic chip or device or the like. For example, the encrypted binary stream can be distributed to a 2-dimensional symbology such as a matrix array. An area symbology as used herein, refers to a symbology, such as those commercially known under the trade names VeriCode™ or VSCode™, that employs a matrix of data cells. As an example, the encoded data can be used to create a matrix of Vericode cells. This can be done by digitizing the encoded data into binary bit form and processing by a software algorithm to generate a code. Such techniques are known in the art such as described in the above-identified U.S. patents.

Preferably, the digital data matrix 340 (such as a VSCode™ matrix, for example) is then stored on a printed card 350. Preferably, the digital data matrix 340 is provided in a form that can be printed on a typical card that can be carried in a purse or wallet or the like. In order to do so, however, it may be desirable to reduce the size or compress the data matrix. This can be done by managing the cell sizes and dots per cell used during the printing process thereby allowing the symbol to be decoded through the use of a predetermined reader.

Figure 4:
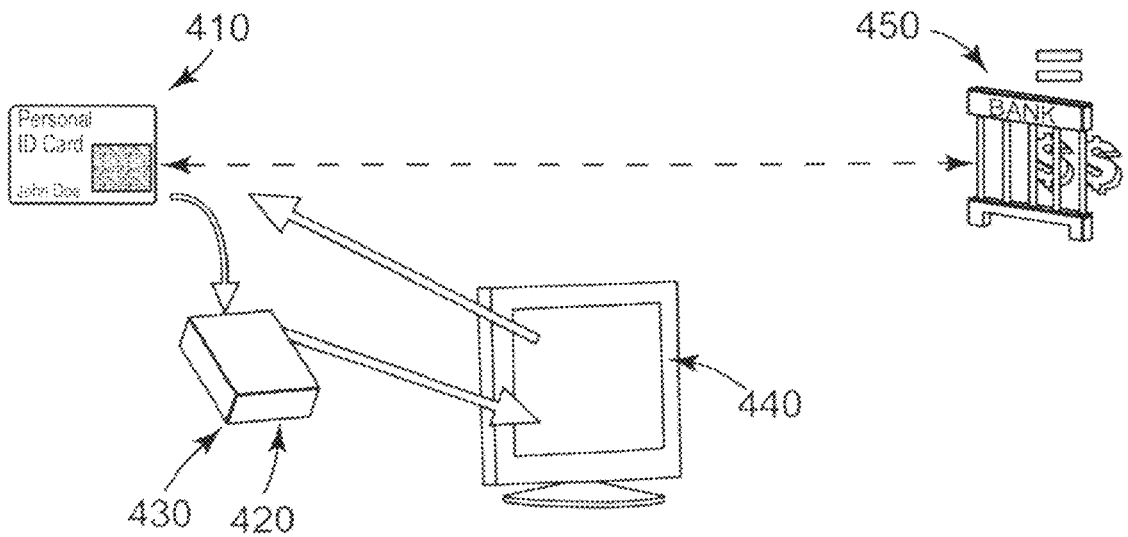
FIG. 4 is a schematic diagram showing how an individual could step through a purchasing process using a secure card in accordance to the present invention.
Figure 6:
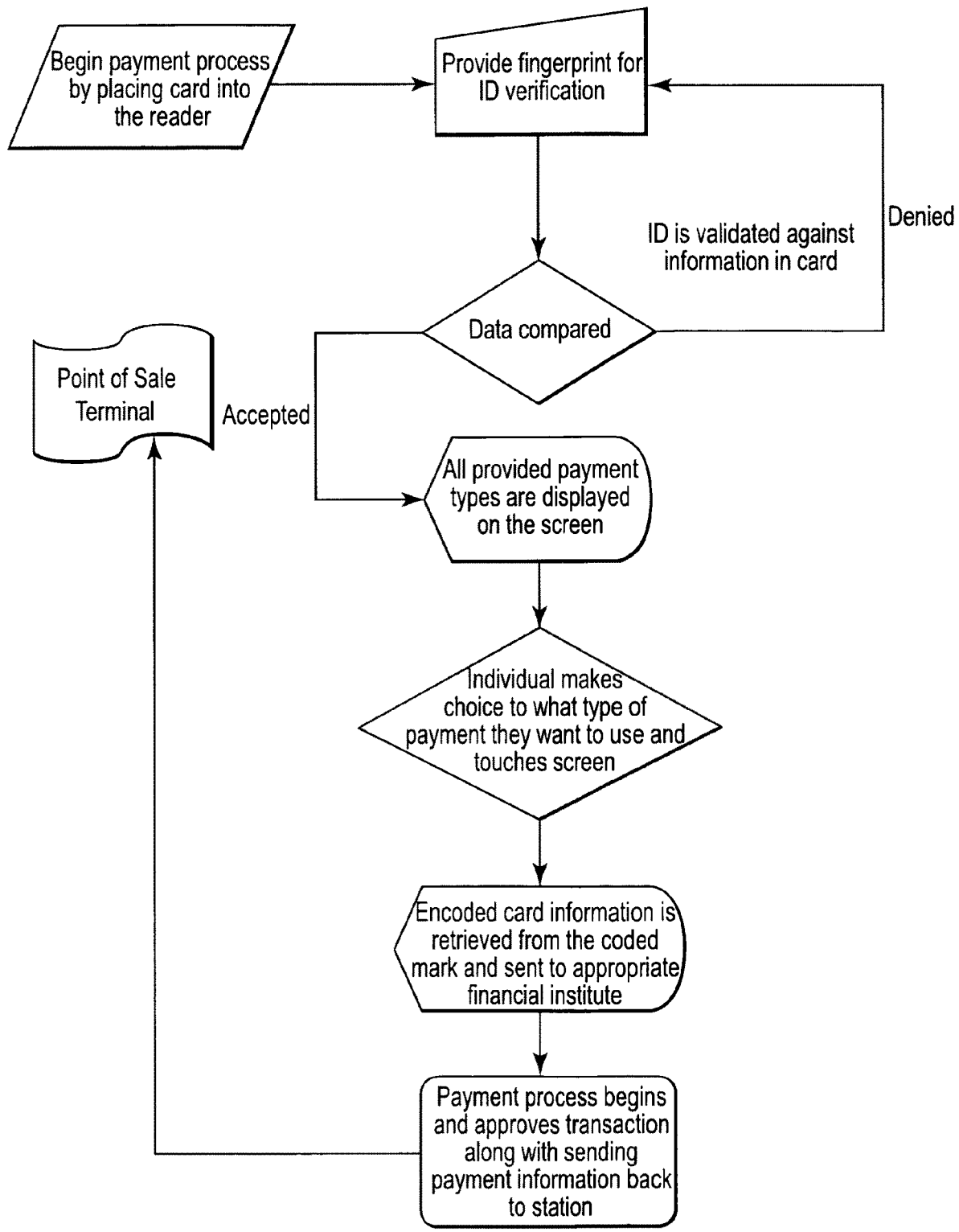
FIG. 6 is a flow chart showing a process that can be used to make purchases including validating a users identity in accordance to the present invention.

A secure card 410 having a printed 2-dimensional matrix as a coded mark can be used by a cardholder to proceed with a transaction at a point of sale as schematically illustrated in FIG. 4 and as a flowchart in FIG. 6. The steps needed are as follows: first the secure card 410 with a 2-dimensional matrix is placed in a reader 420 in order to have the 2-dimensional matrix read and decoded. If finger print authentication is encoded into the 2-dimensional matrix, the cardholder then places their finger onto an accompanying fingerprint reader 430. The reader 430 generates a set of minutia points and through the use of decoding software compares them to those encoded in the 2-dimensional matrix. Once the comparison has been made and a positive validation has been obtained, a graphic will appear on the reader screen 440 depicting all of the payment types that are provided by the card 410. This graphic preferably only shows icons for the payment methods. All pertinent data such as account numbers, credit card numbers, expiration dates, and PIN numbers preferably remain hidden from the screen. This adds to the security in that the information is not revealed to any third parties that might misuse it.

It is contemplated that any type of authentication may be used. A photographic image of one or more authorized cardholders may be included in the two-dimensional matrix. A store clerk can access the images and can use such an images to make a positive identification of an authorized user. Once a cardholder's identity is verified by a clerk, the clerk can authorize access to the payment methods provided by the secure card. In this way, multiple individuals may be authorized to use the same secure card such as spouses who have joint access to a particular financial account. Other information may be used for authenticating an authorized user such as information related to a physical description of the user. Also, an access code or the like may be used to restrict access to authorized user.

Once the icons are shown, the cardholder can then pick the type of payment method they would like to use. Once chosen, the system would go back into the two-dimensional matrix 410 and use the needed account numbers and data to make the standard transaction with a financial institution or bank 450. This transaction step preferably continues to remain private and hidden in the process thereby not exposing any pertinent data and keeping all of the data secure from third party viewing. As the system contacts the financial institute, the process continues as it is currently done.

The present invention has now been described with reference to several embodiments. The foregoing detailed description has been given for clarity of understanding. Others may recognize that changes can be made in the described embodiments without departing from the scope and spirit of the present invention. Thus, the scope of the present invention should not be limited to the exact details and structures described herein.

What is claimed is:

1. A method of making a secure card, the method comprising the steps of:
   obtaining information to be encoded including account information related to a first transaction account;
   obtaining information to be encoded including account information related to a second transaction account;
   encoding the account information of the first transaction account and the second transaction account;
   generating a coded mark, the coded mark comprising a matrix of data cells that represent encoded information of the first and second transaction accounts; and
   providing the coded mark of encoded information on a surface of a card so that by decoding the coded mark, a transaction can be conducted with respect to one of the first and second transaction accounts.

2. The method of claim 1, wherein the information to be encoded comprises alphanumeric information.

3. The method of claim 1, wherein the information to be encoded comprises graphical information.

4. The method of claim 1, wherein the information to be encoded comprises biometric information.

5. The method of claim 1, wherein the information to be encoded comprises functional account information related to a plurality of financial transaction cards.

6. The method of claim 1, wherein the step of encoding the information comprises encoding the information into Reed-Solomon blocks.

7. The method of claim 1, wherein the step of encoding the information comprises using error correction and detection.

8. The method of claim 1, wherein the step of generating a coded mark comprises compressing the information to be encoded.

9. The method of claim 1, wherein the step of providing the coded mark of encoded information on a surface of a card comprises printing the coded mark on a surface of the card.

10. A method of making a secure card, the method comprising the steps of:
    providing a plurality of independently functional financial transaction cards, each financial transaction card associated with a financial account;
    obtaining information to be encoded including financial account information related to a plurality of the financial transaction cards;
    generating a coded two-dimensional mark, the coded mark comprising a matrix of data cells that represent functional information related to each of the independently functional financial transaction cards; and
    providing the coded two-dimensional mark having the functional information related to each of the independently functional financial transaction cards on a surface of a card, wherein the coded two-dimensional mark can be read and decoded so that a financial transaction with any one of the financial accounts of each of the plurality of transaction cards can be completed.

11. A method of using a secure card, the method comprising the steps of:
    receiving a secure card having a coded two-dimensional mark comprising a matrix of data cells on the surface of the secure card, the matrix of data cells within the coded two-dimensional mark representing functional account information related to a plurality of independently functional financial transaction accounts;
    reading and decoding the coded two-dimensional mark for obtaining the functional account information of a plurality of independently functional financial transaction accounts;
    receiving a selection of selecting one of the financial transaction accounts; and
    completing a financial transaction with the selected financial account.

12. A system for conducting financial transactions based upon the use of a transaction card, the system comprising:
    a card reader programmed to read and decode a coded two-dimensional mark;
    a display for showing selected information obtained from the transaction card including information related to multiple different financial transaction accounts;
    a control system for presenting the multiple different financial transaction accounts on the display as decoded from the coded two-dimensional mark, the control system also for receiving a selection from the multiple different financial transaction accounts as made by a user, and for selectively completing a financial transaction including contact with an authority of a financial transaction account for approval using data related to one of the multiple financial transaction accounts that uses information as selected from the display and additional information obtained from the two-dimensional mark related to the selected financial transaction account.

13. The system of claim 12, further including a read of biometric information from the card holder in communication with the control system, the control system further providing a function to compare the read biometric information from the reader with information coded and read from the two-dimensional mark for identification of the card holder authentication.

* * * * *